United States Patent

[11] 3,619,753

[72] Inventor Michael Ainley Thompson
Birmingham, England

[21] Appl. No. 840,675
[22] Filed July 10, 1969
[45] Patented Nov. 9, 1971
[73] Assignee Joseph Lucas (Industries) Limited
Birmingham, England
[32] Priority Dec. 23, 1968
[33] Great Britain
[31] 60989/68

[54] THYRISTOR CIRCUITS
1 Claim, 1 Drawing Fig.

[52] U.S. Cl. ........ 318/345, 321/45 C
[51] Int. Cl. ........ H02m 7/52
[50] Field of Search ........ 321/48, 43, 44, 45; 307/24, 252 C; 317/33; 318/345, 341

[56] References Cited
UNITED STATES PATENTS

| | | | |
|---|---|---|---|
| 3,487,234 | 12/1969 | Morgan | 321/43 X |
| 3,500,161 | 3/1970 | Domann et al. | 318/391 X |

*Primary Examiner*—Oris L. Rader
*Assistant Examiner*—Robert J. Hickey
*Attorney*—Holman and Stern

ABSTRACT: A thyristor circuit has an inductive load and a first thyristor connected in series across a DC source. Connected across the first thyristor is an inductor, a second thyristor and a capacitor, and means is provided for reversing the charge on the capacitor at a convenient time so that the charge on the capacitor can be used to turn off the first thyristor. A diode is connected across the series combination of inductive load and inductor.

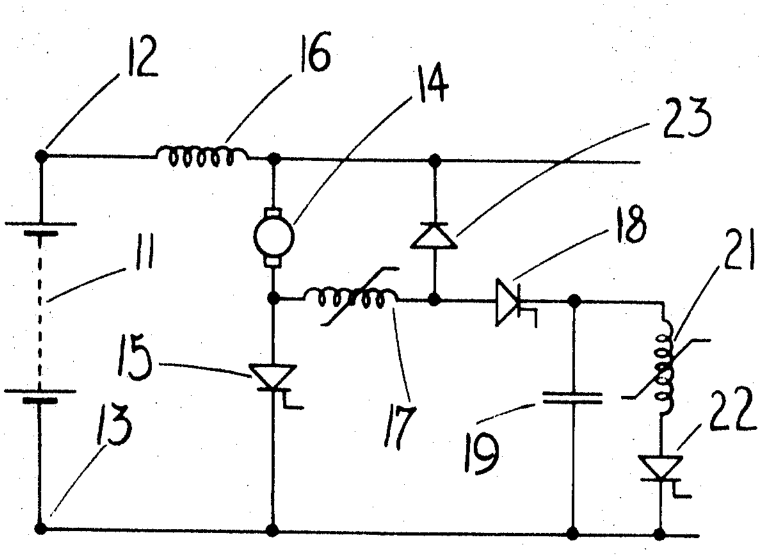
Michael Ainley Thompson
INVENTOR
BY Holman, Glascock, Downing & Seebold
ATTORNEYS

THYRISTOR CIRCUITS

This invention relates to thyristor circuits.

A thyristor circuit according to the invention includes first and second terminals for connection to a DC source, an inductive load and a first thyristor connected in series across said terminals, a first inductor, a second thyristor and a capacitor connected in series across the first thyristor, means for reversing the voltage across said capacitor, and a diode for conducting energy stored in said inductive load, said diode being connected across the series combination of inductive load and first inductor.

In use, the cycle of operations commences with the second thyristor being fired so that the capacitor charges through the inductive load and first inductor, which acts to limit the rate of rise of current in the second thyristor so that it does not become damaged. When the capacitor has charged, the second thyristor is turned off because the current flowing through it falls to zero, and later in the cycle the first thyristor is fired so that current flows in the motor. At some convenient point during the cycle the voltage across the capacitor is reversed, and the cycle is terminated by firing the second thyristor again to apply the reverse voltage on the capacitor across the first thyristor to switch it off. The cycle then continues as before. The first inductor, together with the stray inductance in the leads, acts to boost the voltage across the capacitor when the second thyristor is conducting, and in many systems this is an advantage. However, in higher voltage systems the voltage across the capacitor can become excessive, resulting in unnecessary dissipation of power. This could be avoided by omitting the inductor, but omission of the inductor is undesirable because it also protects the second thyristor. The invention overcomes the problem.

The diode is normally connected across the inductive load, by connecting it across the series combination in accordance with the invention, the boost effect of the first inductor is removed.

The accompanying drawing is a circuit diagram illustrating one example of the invention.

Referring to the drawing, the circuit shown is intended to control a traction motor on a road vehicle. The vehicle includes a battery 11 supplying power to positive and negative terminals 12, 13. The terminals are interconnected through the motor 14 and a first thyristor 15 in series, the inductor 16 shown between the terminal 12 and motor 14 representing the stray inductance in the leads and battery. The junction of the motor 14 and thyristor 15 is connected through an inductor 17, a second thyristor 18 and a capacitor 19 to the terminal 13, and the capacitor 19 is bridged by an inductor 21 and third thyristor 22 in series. The junction of the inductor 17 and thyristor 18 is connected to the terminal 12 through a diode 23.

Any convenient form of firing circuit is used to control the thyristors 15, 18, 22. At the commencement of a cycle, the thyristor 18 is fired, and current flows through the motor 14 and inductor 17 and thyristor 18 to charge the capacitor 19 with its upper plate positive and its lower plate negative. The capacitor 19 will charge to the supply voltage, at which point the diode 23 can conduct, and will be given a boost in charge by the stray inductance in the leads. The stored energy in the inductor 17 is dissipated through the diode 23, and it is to be understood that if the diode 23 has its anode connected to the junction of the inductor 17 and motor 14, as is usual, the stored energy in the inductor 17 would also charge the capacitor 19.

When the capacitor 19 is charged, the current flowing through the thyristor 18 is reduced to zero and so the thyristor 18 turns off. At a later point in the cycle the thyristors 15 and 22 are fired. Firing of the thyristor 15 completes a circuit through the motor 14, and firing of the thyristor 22 causes the charge across the capacitor 19 to flow through the inductor 21 and thyristor 22 so that the lower plate of the capacitor 19 becomes positive and the upper plate negative. At this point, the thyristor 22 is reverse biased and turns off. In order to stop the thyristor 15 conducting, the thyristor 18 is fired again, so that the reverse voltage on the capacitor 19 is applied across the thyristor 15 to turn it off. The inductor 21, like the inductor 17, limits the rate of rise of current in its associated thyristor, as well as its primary function of forming an oscillatory circuit for reverse charging the capacitor 19.

Having thus described my invention what I claim as new and desire to secure by Letters Patent is:

1. A thyristor circuit including first and second terminals for connection to a DC source, an inductive load and a first thyristor connected in series across said terminals, a first inductor, a second thyristor and a capacitor connected in series across the first thyristor, means for reversing the voltage across said capacitor, and a diode for conducting energy stored in said inductive load, said diode being connected across the series combination of inductive load and first inductor.

* * * * *